United States Patent Office.

FRANZ O. MATTHIESSEN, OF IRVINGTON, NEW YORK.

TRANSFORMING SOFT SUGAR INTO HARD SUGAR.

SPECIFICATION forming part of Letters Patent No. 318,639, dated May 26, 1885.

Application filed February 24, 1885. (Specimens.)

*To all whom it may concern:*

Be it known that I, FRANZ O. MATTHIESSEN, of Irvington, New York, have invented a certain Improvement in Transforming Soft Sugar or Granulated Sugar into Hard Sugar, of which the following is a specification.

My invention, which relates to a method of producing hard white sugar in blocks or bodies having marked crystalline surfaces, is especially valuable as a means of transforming into hard sugar the so-called "A" coffee-sugars, and granulated sugars, which can be produced by a single refining operation from sugars of comparatively low grades.

My invention consists in causing soft sugars or granulated sugars or mixtures of such sugars, as the case may be, to absorb or be charged with a concentrated hot pure sugar solution or so-called "white-liquor," which I then permit to cool off, whereby a portion of the sugar of which the white-liquor is composed, incapable of being held in solution at the lower temperature, crystallizes throughout the mass of soft sugar, firmly cementing the particles of soft sugar to each other, and producing a body of hard sugar having the peculiar glistening appearance due to the presence of crystals, not only upon its exterior, but also upon its planes of cleavage when broken. After the crystallization has ceased the excess of white-liquor is drained off by any of the usual methods, and the resultant product of hard sugar, after being dried, may then be broken or cut into blocks or pieces of the desired size and shape.

In carrying out my process in the production of block-sugar I find it convenient to form the soft or granulated sugar into tablets or cakes of, say, five-eighths of an inch thick, twelve inches long, and eight inches wide. This may easily be done by depositing the soft sugar or granulated sugar in molds of the desired size, and slightly compacting it therein by shaking or by slight pressure administered either by a plunger or by a roller moved lightly across the surface after the sugar has been uniformly distributed in the molds. Granulated sugar may, if desired, be slightly moistened in order to make its particles more adherent. The molds containing the sugar are then deposited in a drying-oven having a temperature of, say, from 130° to 140° Fahrenheit. A few hours' subjection to this temperature dries the soft sugar, or the moistened granulated sugar, or the mixture of soft sugar and granulated sugar, as the case may be, so that the particles of sugar adhere to each other sufficiently to permit the cakes to be removed from the molds without breaking apart. The cakes are now ready to be charged with the hot sugar-liquor. This may be effected by gradually immersing the cakes in a bath of concentrated hot white-liquor contained in an open vessel, or more rapidly by placing the cakes in a tank or box having an air-tight cover and exhausting the air, and then introducing into the box or tank a sufficient quantity of concentrated hot white-liquor to completely cover the cakes of sugar deposited therein. In the latter case two causes operate to effect the thorough permeation of the cakes by the hot liquor, the first and more important being the exhaustion of air from the tank, by which a more or less nearly complete vacuum is established in the interstices of the cakes themselves; and, secondly, the white-liquor drives upward any air which may remain in the cakes, because it enters the cakes at the bottom and gradually rises. After a sufficient quantity of liquor has been introduced into the tank to completely cover all the cakes of sugar, air may be admitted into the upper part of the tank above the surface of the white-liquor, and thus atmospheric pressure may be brought into action to force the white-liquor into the cakes. By forcing chilled air into the upper part of the tank the cooling of the white-liquor may be hastened. As the temperature falls a portion of the sugar contained in the white-liquor crystallizes, and this crystallization may be permitted to go on until the cakes are cooled to atmospheric temperature. The temperature of the white-liquor with which the cakes are charged may be as high as 220° Fahrenheit, or even higher, and of course the white-liquor may, if desired, be rendered more fluid by being heated above the temperature at which it is concentrated. The hotter the white-liquor the more sugar it will hold in solution. Hence a concentrated solution of comparatively high temperature will hold in solution a quantity of sugar largely in excess of the quantity capable of being held in solution at the lower temperature to which the charged cakes of sugar are reduced before being removed from the solution and drained. Therefore the quantity of sugar caused to be added to the cakes by the crystallization of sugar from the white-liquor with which they are permeated may be varied by varying the temperature of the concentrated hot white-liquor employed to charge them, and also, if desired, by varying the duration of their immersion in the white-liquor. If a very hard and heavy product is desired, a concentrated white liquor of high temperature will be employed, and crystallization will be permitted to go on until the charged cakes are reduced to atmospheric temperature. On the other hand, if it be desired to effect the cementation of the constituent particles of the cakes to each other with only a small addition to the weight of the cake, a concentrated white-liquor of comparatively low temperature will be employed, or the cakes will be removed from the solution and drained before being fully cooled. When the desired crystallization has taken place, the cakes may be drained by introduction into a centrifugal machine, or by any other convenient method. The cakes are then dried at a comparatively low temperature, and will be found to be more or less hard and to look like loaf-sugar, presenting a bright, glistening, crystalline appearance, not only upon their surfaces, but upon their planes of cleavage when cut or cracked into blocks.

As by my method soft sugars or granulated sugars or mixtures of such sugars are transformed into cakes or bodies of hard sugar by a process of cementation by crystallization, I designate the product of my process as "double crystallized sugar." It will of course be understood that the shape and size of the cakes or bodies of hard sugar produced by my process may be varied by changing the shape and dimensions of the molds in which the soft sugar or granulated sugar is deposited preparatory to being charged with the hot white-liquor. Thus, if it be desired to produce hard sugar in the form of the ordinary sugar loaf, the mold will have the shape of a frustum of a cone.

The baking of soft sugar or moistened granulated sugar in the molds is practiced as a matter of convenience when the cakes are to be removed from the molds before being charged with white-liquor. When the white-liquor is to be introduced directly into the molds containing the soft sugar or granulated sugar, or when the soft sugar or granulated sugar is deposited in molds into which the hot white-liquor has previously been introduced, the baking may, if desired, be omitted, which may be convenient in manufacturing hard sugar in the form of loaves. In the latter case, if granulated sugar is employed, it will not require to be moistened, but may be perfectly dry when deposited in the mold, and the mold may be provided with an aperture in the bottom, through which the hot white-liquor can be introduced.

I claim as my invention—

The herein-described process of transforming soft sugar or granulated sugar, or mixtures thereof, into hard sugar by cementation of the particles of soft sugar or granulated sugar to each other, produced by the crystallization of sugar from white-liquor which has been introduced, in the form of a more or less concentrated hot solution, into the interstices between the particles of soft sugar or granulated sugar, and then allowed to cool.

F. O. MATTHIESSEN.

Witnesses:
M. L. ADAMS,
R. C. HOWES.